United States Patent
Kechichian

(10) Patent No.: US 9,338,278 B2
(45) Date of Patent: May 10, 2016

(54) DETERMINING THE DISTANCE AND/OR ACOUSTIC QUALITY BETWEEN A MOBILE DEVICE AND A BASE UNIT

(75) Inventor: Patrick Kechichian, Eindhoven (NL)

(73) Assignee: KONINKLIJKE PHILIPS N.V, Eindhoven (NL)

( * ) Notice: Subject to any disclaimer, the term of this patent is extended or adjusted under 35 U.S.C. 154(b) by 76 days.

(21) Appl. No.: 14/007,682

(22) PCT Filed: Mar. 27, 2012

(86) PCT No.: PCT/IB2012/051442
§ 371 (c)(1),
(2), (4) Date: Sep. 26, 2013

(87) PCT Pub. No.: WO2012/131570
PCT Pub. Date: Oct. 4, 2012

(65) Prior Publication Data
US 2014/0024317 A1    Jan. 23, 2014

(30) Foreign Application Priority Data
Mar. 30, 2011   (EP) ...................................... 11160378

(51) Int. Cl.
| | | |
|---|---|---|
| *G01S 5/14* | (2006.01) | |
| *H04M 1/725* | (2006.01) | |
| *H04M 9/08* | (2006.01) | |
| *G10L 25/69* | (2013.01) | |
| *H04M 1/677* | (2006.01) | |
| *H04M 1/73* | (2006.01) | |

(52) U.S. Cl.
CPC ...... *H04M 1/72536* (2013.01); *H04M 1/72541* (2013.01); *H04M 9/082* (2013.01); *G10L 25/69* (2013.01); *H04M 1/6775* (2013.01); *H04M 1/72502* (2013.01); *H04M 1/73* (2013.01)

(58) Field of Classification Search
CPC ............ H04M 1/6066; H04M 1/6041; H04M 1/6058; H04M 1/6033; H04M 1/6091; G01S 5/14; G01S 7/4808
See application file for complete search history.

(56) References Cited

U.S. PATENT DOCUMENTS

| | | | |
|---|---|---|---|
| 6,260,765 B1 | 7/2001 | Natale et al. | |
| 6,542,436 B1 | 4/2003 | Myllyla | |
| 6,925,296 B2 | 8/2005 | Mattisson | |
| 6,952,471 B1 | 10/2005 | Cannon et al. | |
| 7,251,471 B2 | 7/2007 | Boling et al. | |
| 7,263,373 B2 | 8/2007 | Mattisson | |
| 7,330,122 B2 | 2/2008 | Derrick et al. | |
| 2002/0086656 A1* | 7/2002 | Mattisson | ...................... 455/355 |
| 2003/0118197 A1* | 6/2003 | Nagayasu | .............. H04B 1/385 381/74 |

(Continued)

FOREIGN PATENT DOCUMENTS

| | | |
|---|---|---|
| CN | 1688895 A | 10/2005 |
| GB | 2350969 | 12/2000 |
| WO | 2004017087 A1 | 2/2004 |

*Primary Examiner* — Andrew Wendell

(57) ABSTRACT

To determine the distance and/or acoustic quality between a mobile device and a base unit, an acoustic signal is received by a microphone in one of said mobile device and base unit. A correlation of a second signal with the received acoustic signal is determined. An acoustic quality and/or a distance between the mobile device and the base unit is determined based on one or more peaks in the result of the step of determining the correlation.

17 Claims, 9 Drawing Sheets

(56) References Cited

U.S. PATENT DOCUMENTS

| | | | |
|---|---|---|---|
| 2008/0021706 A1* | 1/2008 | Bruwer | H04R 27/00 704/233 |
| 2008/0240415 A1 | 10/2008 | Mohammad et al. | |
| 2008/0304361 A1* | 12/2008 | Peng et al. | 367/127 |
| 2009/0143047 A1* | 6/2009 | Hays et al. | 455/404.2 |
| 2010/0017205 A1 | 1/2010 | Visser et al. | |
| 2010/0019431 A1 | 1/2010 | MacLoed et al. | |
| 2010/0074451 A1* | 3/2010 | Usher | H04R 25/70 381/58 |
| 2010/0194631 A1 | 8/2010 | Janetis et al. | |
| 2010/0311388 A1 | 12/2010 | Flippo et al. | |
| 2010/0329481 A1* | 12/2010 | Fukuda | H04R 1/1083 381/94.1 |

* cited by examiner

DETERMINING THE DISTANCE AND/OR ACOUSTIC QUALITY BETWEEN A MOBILE DEVICE AND A BASE UNIT

CROSS-REFERENCE TO PRIOR APPLICATIONS

This application is the U.S. National Phase application under 35 U.S.C. §371 of International Application Serial No. PCT/IB2012/051442, filed on Mar. 27, 2012, which claims the benefit of European Application Serial No. 11160378.3, filed on Mar. 30, 2011. These applications are hereby incorporated by reference herein.

TECHNICAL FIELD OF THE INVENTION

The invention relates to determining whether a mobile device is in proximity of a base unit, and in particular to determining the proximity in terms of distance and/or acoustic quality between a mobile device and a base unit using acoustic signals.

BACKGROUND TO THE INVENTION

A personal emergency response system (PERS) comprises a base unit that is typically located in the home of a user and comprises at least a microphone and a speaker. The base unit is connected to a remote monitoring station via a communication network (for example a mobile network or a PSTN) which allows a user to contact their healthcare provider or an emergency service if they require assistance.

A mobile PERS (MPERS) also has a small mobile or portable device (for example in the form of a mobile phone, wrist watch or pendant) that is worn or carried by the user. The mobile device has a respective microphone and speaker and is wirelessly connected to the base unit. The user can use the mobile device to communicate with the remote monitoring station via the base unit. The mobile device may also comprise one or more sensors for monitoring the status or health of the user (for example accelerometers for detecting falls by the user). The mobile device may also comprise an emergency or panic button that the user can use to quickly contact the remote monitoring station.

US 2010/0311388 describes a system comprising a portable device having a cellular transceiver module, a GPS module and an emergency call button, and a base station that communicates with a response centre. A user also has a wearable pendant having a panic button, and when the panic button is activated, a signal is output to the portable device. If the portable device is not in proximity to the base station, which is determined based on RF signals, the portable device contacts the response centre in response to the activation of the panic button. If the portable device is in proximity of the base station, the base station receives the signal and communicates with the response centre. While the portable device is in proximity to the base station, the GPS module is powered down and the cell is put into sleep mode.

Thus, in this system, the power consumed by the portable device can be reduced when it is in close proximity to a base station. However, it is desirable to be able to further reduce the power consumption of a mobile device in this type of system. This is particularly the case during an emergency call, since the call may need to be maintained with the remote monitoring station for some time.

SUMMARY OF THE INVENTION

One aspect of the invention provides that the power consumption of a mobile device in this type of system can be reduced by switching off components in the mobile device used to reproduce audio (for example a digital to analog converter, audio amplifier, loudspeaker) when the user (and thus the mobile device) is in close proximity to the base unit. The audio or speech for the user can instead be output from the speaker in the base unit. However, the loudspeaker and related components in the mobile device should only be switched off if the user is close enough to the base unit to be able to hear and understand the speech broadcast by the loudspeaker in the base unit.

Thus, it is not appropriate to use the conventional RF signal-based methods for determining the proximity of a user and mobile device to a base unit, since these methods may determine that the user and mobile device are in proximity to the base unit (e.g. based on a received RF signal strength or on triangulation by an additional access point), even though the user may not be able to clearly hear and understand the speech from the base unit (for example the user and mobile device may be in an adjacent or different room to the base unit, with the intervening door closed).

Therefore, there is a need for an alternative approach to determining the proximity of a mobile device (and a user) to a base unit to allow a loudspeaker of the mobile device to be switched off during a communication, while ensuring that the user can hear and perceive the speech from the speaker in the base unit.

Thus, the invention provides that the proximity of the mobile device to the base unit is determined by assessing the distance or acoustic quality between the mobile device and the base unit. In particular embodiments, the acoustic quality is assessed in terms of the quality of the user's speech as received at the base unit and/or the quality of the sound received at the mobile device from the speaker of the base unit.

Various embodiments of the invention are defined in the following statements.

Statement 1. A method of determining the distance and/or acoustic quality between a mobile device and a base unit, the method comprising receiving an acoustic signal by a microphone in one of said mobile device and base unit; determining a correlation of a second signal with the received acoustic signal; and determining the acoustic quality and/or the distance between the mobile device and the base unit based on one or more peaks in the result of the step of determining the correlation.

Statement 2. A method as recited in Statement 1, wherein the step of determining the correlation comprises determining coefficients of an adaptive filter for removing the second signal from the received acoustic signal, and wherein the result of the step of determining the correlation comprises an impulse response of the adaptive filter.

Statement 3. A method as recited in Statement 2, further comprising the step of smoothing the magnitude square of the determined coefficients.

Statement 4. A method as recited in Statement 1, 2 or 3, wherein the acoustic signal received by the microphone in said one of said mobile device and base unit is received from a speaker in the other one of said mobile device and base unit that outputs the acoustic signal in response to a control signal.

Statement 5. A method as recited in Statement 4, wherein the second signal corresponds to the signal used to control the speaker in said other one of said mobile device and base unit to output the acoustic signal.

Statement 6. A method as recited in Statement 4, the method further comprising the step of receiving the acoustic signal in a microphone in said other one of said mobile device and base unit.

Statement 7. A method as recited in Statement 6, wherein the second signal corresponds to the acoustic signal received in said other one of said mobile device and base unit.

Statement 8. A method as recited in any of Statements 4 to 7, wherein the step of determining the acoustic quality and/or the distance between the mobile device and the base unit comprises detecting a single peak in the result of the step of determining.

Statement 9. A method as recited in Statement 8, wherein the step of determining comprises determining the distance between the mobile device and the base unit from the timing of the peak detected in the result of the step of determining.

Statement 10. A method as recited in Statement 8 or 9, wherein the step of determining comprises determining the acoustic quality between the mobile device and the base unit from (i) the dispersion of the detected peak; and/or (ii) the reverberation time around the detected peak.

Statement 11. A method as recited in Statement 4, the method further comprising the step of controlling a speaker in said one of said mobile device and base unit to output the acoustic signal; wherein the step of receiving an acoustic signal by the microphone in one of said mobile device and base unit comprises receiving the acoustic signal from the speaker in said mobile device and said base unit.

Statement 12. A method as recited in Statement 11, wherein the step of determining the acoustic quality and/or the distance between the mobile device and the base unit comprises detecting a first peak in the result of the step of determining corresponding to the acoustic signal from the speaker in said one of said mobile device and base unit and a second peak corresponding to the acoustic signal from the speaker in said other one of said mobile device and base unit.

Statement 13. A method as recited in Statement 12, wherein the step of determining the acoustic quality and/or the distance comprises determining the distance between the mobile device and the base unit from the distance between the first and second peaks in the result of the step of determining.

Statement 14. A method as recited in Statement 12 or 13, wherein the step of determining the acoustic quality and/or the distance comprises determining the acoustic quality between the mobile device and the base unit from (i) the ratio of the magnitudes of the detected peaks; (ii) the dispersion around the second peak; and/or (iii) the reverberation time around the second peak.

Statement 15. A method as recited in any of Statements 11 to 14, wherein the second signal corresponds to the signal used to control the speaker in said other one of said mobile device and base unit to output the acoustic signal.

Statement 16. A method as recited in any of Statements 4 to 15, wherein the control signal used to control the speaker in said other one of said mobile device and base unit comprises a speech signal received from a remote monitoring station.

Statement 17. A method as recited in any of Statements 4 to 15, wherein the control signal used to control the speaker in said other one of said mobile device and base unit comprises a signal derived from an audio file stored locally in said mobile device and/or said base unit.

Statement 18. A method as recited in Statement 17, wherein the speaker in the other one of said mobile device and base unit that outputs the acoustic signal in response to the control signal derived from the audio file is activated in response to a trigger signal sent from said one of said mobile device and base unit.

Statement 19. A method as recited in Statement 1, 2 or 3, wherein the step of receiving an acoustic signal comprises receiving an acoustic signal by a microphone in the base unit, the method further comprising the step of receiving an acoustic signal by a microphone in the mobile device, wherein the acoustic signal received by the microphone in the mobile device is used as the second signal in the step of determining a correlation of a second signal with the received acoustic signal.

Statement 20. A method as recited in Statement 19, wherein the acoustic signal received by the microphones in the mobile device and the base unit is the speech of a user of the mobile device.

Statement 21. A method as recited in Statement 19 or 20, wherein the step of determining the acoustic quality and/or the distance between the mobile device and the base unit comprises detecting a single peak in the result of the step of determining.

Statement 22. A method as recited in Statement 21, wherein the step of determining comprises determining the distance between the mobile device and the base unit from the timing of the peak detected in the result of the step of determining.

Statement 23. A method as recited in Statement 21 or 22, wherein the step of determining comprises determining the acoustic quality between the mobile device and the base unit from (i) the dispersion around the detected peak; and/or (ii) the reverberation time around the detected peak.

Statement 24. A method of reducing the power consumption of a mobile device, the method comprising determining the distance and/or acoustic quality between the mobile device and a base unit according to the method according to any of Statements 1 to 23; and deactivating a speaker of the mobile device if it is determined that the mobile device is closer than a threshold distance to the base unit or the acoustic quality is greater than a threshold value.

Statement 25. A system, comprising:

a mobile device; a base unit; and a processor; wherein one of the mobile device and base unit comprises a microphone for receiving an acoustic signal; and wherein the processor is configured to determine a correlation of a second signal with the received acoustic signal; and determine the acoustic quality and/or the distance between the mobile device and the base unit based on one or more peaks in the result of the step of determining.

Statement 26. A system as recited in Statement 25, wherein the processor is configured to determine the correlation by determining coefficients of an adaptive filter for removing the second signal from the received acoustic signal, and wherein the result of the step of determining the correlation comprises an impulse response of the adaptive filter.

Statement 27. A system as recited in Statement 26, wherein the processor is further configured to smooth the magnitude square of the determined coefficients.

Statement 28. A system as recited in Statement 25, 26 or 27, wherein the other one of said mobile device and base unit comprises a speaker for outputting the acoustic signal in response to a control signal.

Statement 29. A system as recited in Statement 28, wherein the second signal corresponds to the signal used to control the speaker in said other one of said mobile device and base unit to output the acoustic signal.

Statement 30. A system as recited in Statement 28, wherein the other one of said mobile device and base unit comprises a microphone for receiving the acoustic signal Statement 31. A system as recited in Statement 30, wherein the second signal corresponds to the acoustic signal received by the microphone in said other one of said mobile device and base unit.

Statement 32. A system as recited in any of Statements 25 to 31, wherein the processor is configured to determine the acoustic quality and/or the distance between the mobile device and the base unit by detecting a single peak in the result of the correlation.

Statement 33. A system as recited in Statement 32, wherein the processor is configured to determine the distance between the mobile device and the base unit from the timing of the peak detected in the result of the correlation.

Statement 34. A system as recited in Statement 32 or 33, wherein the processor is configured to determine the acoustic quality between the mobile device and the base unit from (i) the dispersion around the detected peak; and/or (ii) the reverberation time around the detected peak.

Statement 35. A system as recited in Statement 25, wherein said one of said mobile device and base unit further comprises a speaker for outputting the acoustic signal; and wherein the microphone in said one of said mobile device and base unit receives an acoustic signal from the speakers in said mobile device and said base unit.

Statement 36. A system as recited in Statement 35, wherein the processor is configured to determine the acoustic quality and/or the distance between the mobile device and the base unit by detecting a first peak in the result of the correlation corresponding to the acoustic signal from the speaker in said one of said mobile device and base unit and a second peak corresponding to the acoustic signal from the speaker in said other one of said mobile device and base unit.

Statement 37. A system as recited in Statement 36, wherein the processor is configured to determine the acoustic quality and/or the distance by determining the distance between the mobile device and the base unit from the distance between the first and second peaks.

Statement 38. A system as recited in Statement 36 or 37, wherein the processor is configured to determine the acoustic quality and/or the distance by determining the acoustic quality between the mobile device and the base unit from (i) the ratio of the magnitudes of the detected peaks; (ii) the dispersion around the second peak; and/or (iii) the reverberation time around the second peak.

Statement 39. A system as recited in any of Statements 35 to 38, wherein the second signal corresponds to the signal used to control the speaker in said other one of said mobile device and base unit to output the acoustic signal.

Statement 40. A system as recited in any of Statements 27 to 39, wherein the control signal used to control the speaker in said other one of said mobile device and base unit comprises a speech signal received from a remote monitoring station.

Statement 41. A system as recited in any of Statements 27 to 39, wherein the control signal used to control the speaker in said other one of said mobile device and base unit comprises a signal derived from an audio file stored locally in said mobile device and/or said base unit.

Statement 42. A system as recited in Statement 41, wherein the speaker in the other one of said mobile device and base unit that outputs the acoustic signal in response to the control signal derived from the audio file is configured to be activated in response to a trigger signal sent from said one of said mobile device and base unit.

Statement 43. A system as recited in Statement 25, 26 or 27, wherein each of the mobile device and base unit comprise a microphone for receiving an acoustic signal, wherein the processor is configured to use the acoustic signal received by the microphone in the mobile device as the second signal in determining the correlation of the second signal with the received acoustic signal.

Statement 44. A system as recited in Statement 43, wherein the acoustic signal received by the microphones in the mobile device and the base unit is the speech of a user of the mobile device.

Statement 45. A system as recited in Statement 43 or 44, wherein the processor is configured to determine the acoustic quality and/or the distance between the mobile device and the base unit by detecting a single peak in the result of the correlation.

Statement 46. A system as recited in Statement 45, wherein the processor is configured to determine the distance between the mobile device and the base unit from the timing of the peak detected in the result of the correlation.

Statement 47. A system as recited in Statement 45 or 46, wherein the processor is configured to determine the acoustic quality between the mobile device and the base unit from (i) the dispersion around the detected peak; and/or (ii) the reverberation time around the detected peak.

Statement 48. A system as recited in any of Statements 25 to 47, wherein the mobile device comprises a speaker, and wherein the mobile device is configured to deactivate the speaker if it is determined that the mobile device is closer than a threshold distance to the base unit or the acoustic quality is greater than a threshold value.

BRIEF DESCRIPTION OF THE DRAWINGS

Embodiments of the invention will now be described, by way of example only, with reference to the following drawings, in which.

DETAILED DESCRIPTION OF THE PREFERRED EMBODIMENTS

Although the invention is described below as being applied to a mobile personal emergency response system (MPERS), it will be appreciated that the methods of detecting the proximity of a mobile device to a base unit can be applied to other types of systems.

Furthermore, although the invention is described as being for determining whether it is possible to conserve power in a mobile device by switching off the speaker (and associated components), it will be appreciated that the result of the proximity detection can be used for many other purposes, such as performing hand-overs of a running call from one communication unit to another among a set of distributed units within the home, or for automatically adjusting the gain of an amplifier in a base unit.

Figure 1:
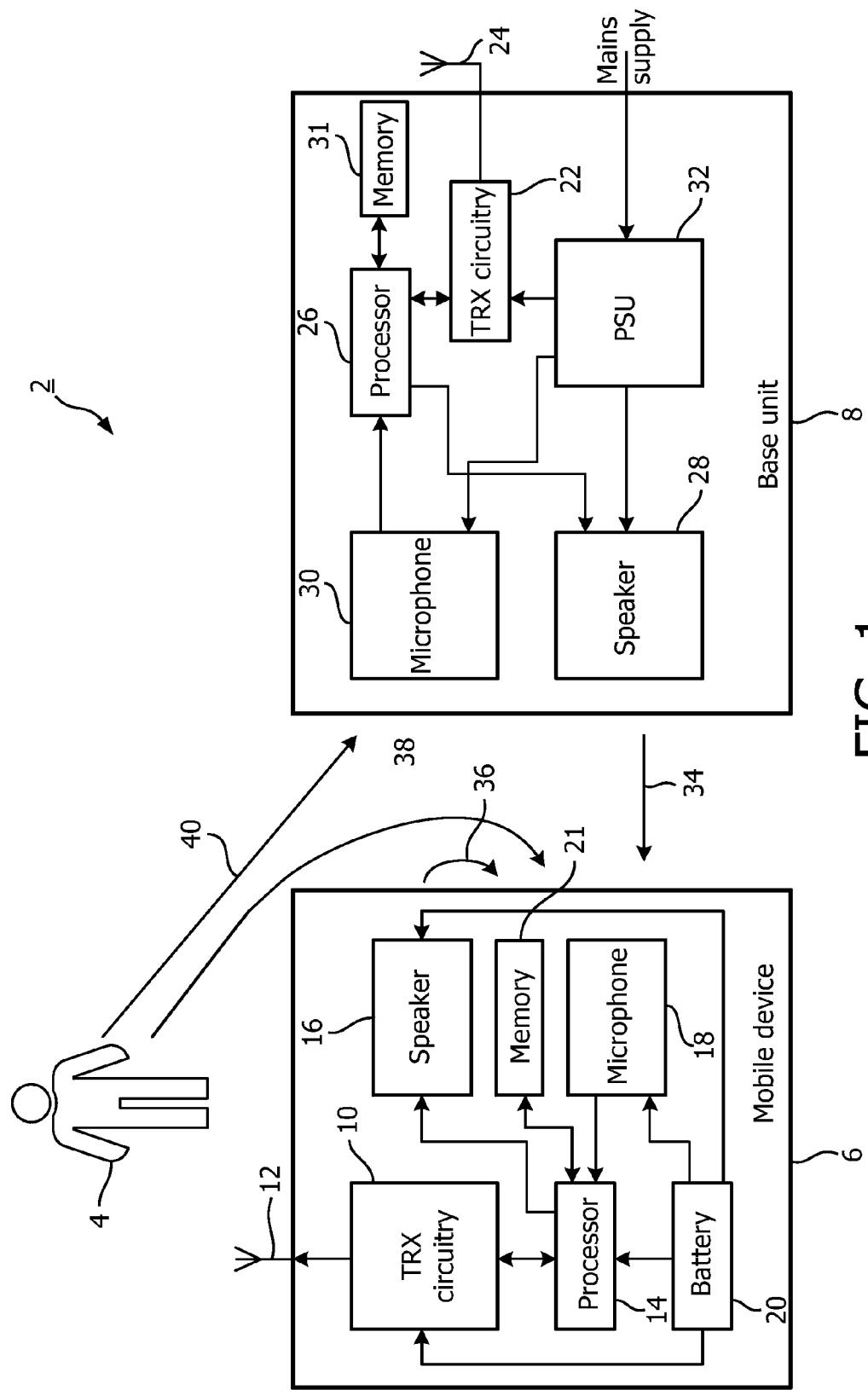
FIG. 1 is a block diagram of a mobile device and base unit in accordance with the invention.

Part of a MPERS 2 for a user 4 in which the invention can be implemented is shown in FIG. 1. The MPERS 2 comprises a mobile device 6 and a base unit 8.

The mobile device 6 can take any suitable form, for example a pendant that is worn around the user's neck, a wrist watch, a mobile telephone, PDA, etc, and is generally in close proximity to the user 4. The mobile device 6 comprises transceiver circuitry 10 and associated antenna 12 for communicating with the base unit 8. The transceiver circuitry 10 can be configured to use any suitable communications protocol, including, for example, Bluetooth or DECT. In addition, the transceiver circuitry 10 may be configured to use a mobile telecommunications protocol, for example, GSM or CDMA, so that the mobile device 6 can directly contact a remote monitoring station if the mobile device 6 is not in range of the base unit 8 (for example if the user 4 is away from home).

The mobile device 6 also comprises a processor 14, speaker 16 and microphone 18. The processor 14 controls the operation of the mobile device 6. The speaker 16 is provided to output audio (usually speech) received from the remote monitoring station via the base unit 8 (provided that the mobile device 6 is in range of the base unit 8). In FIG. 1, block 16 also represents other components associated with the speaker 16, for example a digital to analog converter and audio amplifier.

The microphone 18 detects audio (again, usually speech) from the user 4 and converts the audio into an electrical signal for transmission to the remote monitoring station (again, via the base unit 8 if the mobile device 6 is in range).

The mobile device 6 also comprises a battery 20 or other suitable power source that supplies power to the various components of the mobile device 6. The processor 14 can be configured to control which of the components (e.g. the transceiver circuitry 10, speaker 16 and microphone 18) are powered by the battery 20 at any particular time.

In some embodiments, the mobile device 6 can include a memory 21 that stores pre-recorded audio files for playback by the speaker 16 of the mobile device 6. These audio files can be output in an emergency situation if the speaker 16 is powered, for example to inform a user 4 that a connection to the remote monitoring station is being established.

The base unit 8 comprises transceiver circuitry 22 and associated antenna 24 for communicating with the mobile device 6. As in the mobile device 6, the transceiver circuitry 22 in the base unit 8 can be configured to use any suitable communications protocol, including, for example, Bluetooth or DECT. In addition, the transceiver circuitry 22 may be configured to use a mobile telecommunications protocol, for example, GSM or CDMA, for allowing the base unit 8 to contact the remote monitoring station. Alternatively, or in addition, the transceiver circuitry 22 may be configured to connect to a public switched telephone network (PSTN) via a wall socket in the user's home.

The base unit 8 also comprises a processor 26, speaker 28 and microphone 30. The processor 26 controls the operation of the base unit 8. The speaker 28 is provided to output audio (usually speech) received from the remote monitoring station. In some embodiments, the base unit 8 comprises a memory 31 that includes the same pre-recorded audio files as stored in the memory 21 of the mobile device 6 for automatic playback during an emergency call.

The microphone 30 detects audio (again, usually speech) from the user 4 and converts the audio into an electrical signal for transmission to the remote monitoring station.

The base unit 8 also comprises a power supply unit, PSU, 32 that connects to a mains power supply in the user's home and supplies power to the various components of the base unit 8. The PSU 32 may also include a battery or other suitable power source to act as a back-up power supply in the event that there is an interruption in the mains supply or the main supply otherwise fails.

As described above, the invention provides a way of adaptively determining the distance of a user 4 from the base unit 8 in real-time, based solely on acoustic measurements. In this way, if the user 4 is deemed to be located in close proximity to the base unit 8, then the speaker 16 in the mobile device 6 can be switched off and the audio can be output just by the speaker 28 in the base unit 8 instead. However, if the user 4 is located too far away from the base unit 8 to clearly hear and understand hear the sound from the speaker 28 in the base unit 8, then the speaker 28 in the mobile device 6 can be switched on during an emergency call (likewise if the mobile device 6 is out of wireless range of the base unit 8).

Unlike radio (i.e. RF)-based proximity methods, embodiments of the invention allow the quality of the speech signal picked up by the base unit 8 to be measured, and/or the quality of the speech signal from the base unit 8 received at the mobile device 6 to be measured, since they can take effects such as reverberation into account. For example, in cases where the user 4 (or base unit 8) is located outside of the reverberation radius (also known as the critical distance) from the sound source (i.e. user 4 or base unit speaker 28) where the direct and diffuse contributions of a sound source are equal in intensity, the speaker 16 in the mobile device 6 should be switched on.

Figure 2:
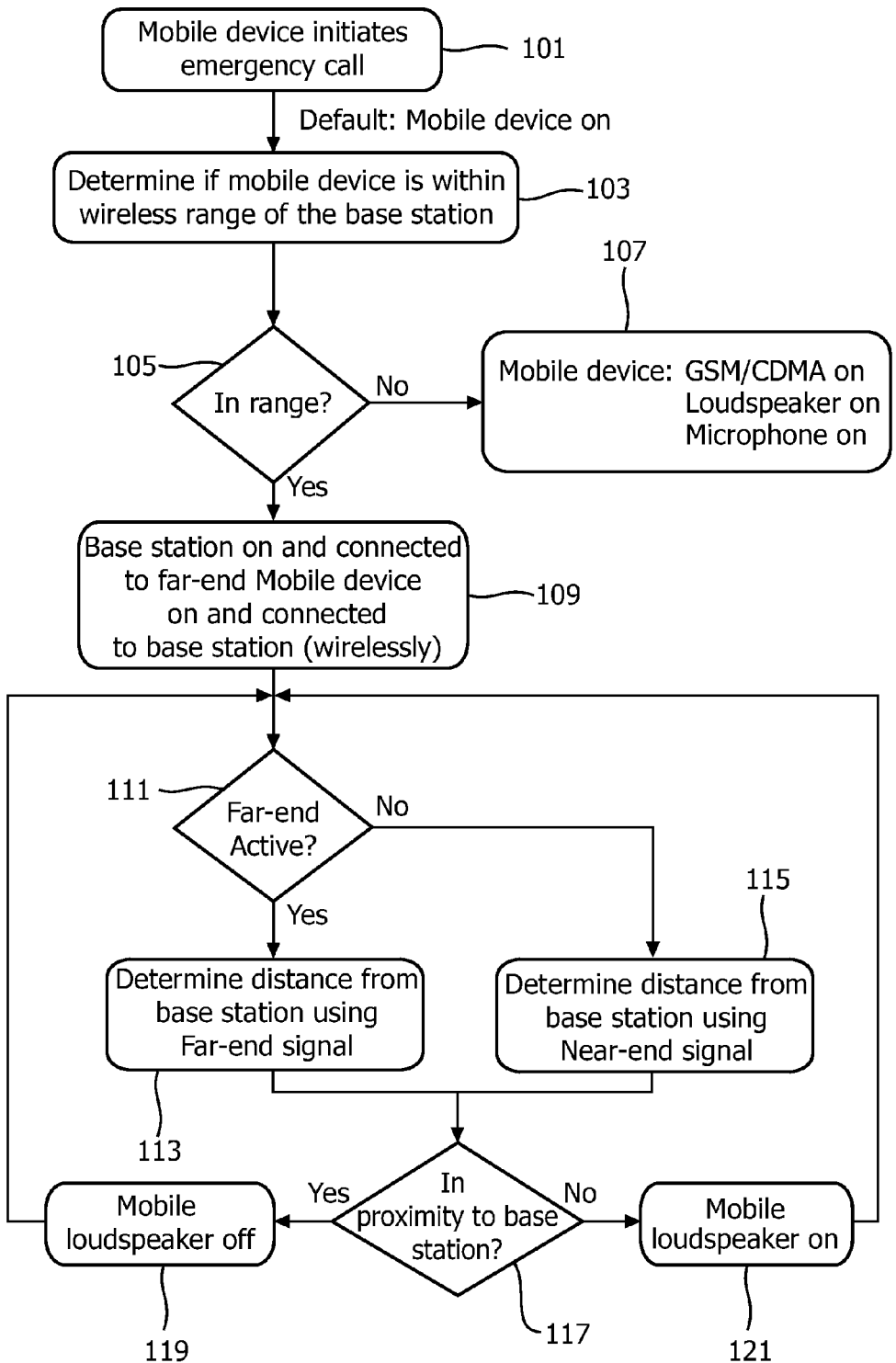
FIG. 2 is a flow chart illustrating a method of operating a mobile device during a call to a remote monitoring station.

A flow chart illustrating a method of operating a mobile device during a call to a remote monitoring station is shown in FIG. 2. In step 101, the mobile device 6 initiates a call to the remote monitoring station. The call may be triggered by the user 4 pressing an emergency or other button on the mobile device 6, or by one or more sensors in the mobile device 6 detecting an emergency event (such as a fall by the user 4).

In step 103, the mobile device 6 determines if it is within wireless range of the base unit 8. This can be determined, for example, by the mobile device 6 determining if it can receive a signal from the base unit 8. Those skilled in the art will be aware of alternative ways in which this can be determined.

If the mobile device 6 is not in wireless range of the base unit 8, the mobile device 6 contacts the remote monitoring station directly using its transceiver circuitry 10 and antenna 12. In this case, the transceiver circuitry 10, speaker 16 and microphone 18 in the mobile device 6 are powered (step 107).

If the mobile device 6 is in wireless range of the base unit 8, the mobile device 6 wirelessly connects to the base unit 8, and the base unit 8 establishes a call with the remote monitoring station (step 109). In this case, the GSM/CDMA part of the transceiver circuitry 10 (which may be a separate module to that used to establish a wireless connection to the base unit 8) can be powered down.

In step 111, it is determined if a far-end user is active. The far-end user is the person or computer at the remote monitoring system (e.g. response centre) that provides audio (typically speech) to the user 4, which is output by the speaker 28 in the base unit 8 and speaker 16 in the mobile device 6. Numerous methods exist for detecting the activity (i.e. speech) of a far-end user, such as a basic power-based method that compares the instantaneous power to some long-term noise floor estimates. Those skilled in the art will be aware of alternative ways in which far-end activity can be detected.

If the far-end user is active, the distance between the base unit 8 and the mobile device 6 is determined using the far-end signal, which is preferably audio output by speaker 16 and speaker 28, as received by the microphone 18 in the mobile device 6, respectively illustrated by arrows 34 and 36 in FIG. 1. This is step 113 in FIG. 2.

As an alternative to using a far-end signal, the distance between the base unit 8 and the mobile device 6 can be determined using sound from a stored audio file that is output by the speaker 16 and speaker 28.

If the far-end user is not active (for example if he or she is listening to the user 4), or if the base unit 8 is not otherwise generating sound with speaker 28, the distance between the base unit 8 and the mobile device 6 is determined using a near-end signal, which is the audio (i.e. speech) from the user 4 as received by the microphone 18 in the mobile device 6 and microphone 30 in the base unit 8, respectively illustrated by arrows 38 and 40 in FIG. 1. This is step 115 in FIG. 2. The detection of the activity of a near-end user can be performed in a similar way for the far-end user, and those skilled in the art will be aware of alternative ways in which near-end activity can be detected.

Once the distance between the mobile device 6 and base unit 8 has been determined in step 113 or 115, it is determined whether the mobile device 6 is in acoustic proximity to the base unit 8 (i.e. are the user 4 and mobile device 6 close enough to the base unit 8 for the user 4 to clearly hear and understand the speech output by the speaker 28 in the base unit 8?).

If the mobile device 6 is in acoustic proximity to the base unit 8, the speaker 16 in the mobile device 6 can be switched off (step 119). If the mobile device 6 is not in acoustic proximity of the base unit, the speaker 16 in the mobile device 6 can be switched on (step 121).

After steps 119 and 121, the method can return to step 111 and repeat.

Alternatively, measurements of both the far-end (or audio file-based) and near-end signals can be made, before using the results of both measurements to make a decision on whether the mobile device 6 is in acoustic proximity to the base unit 8.

The following description of embodiments of the invention refers to determining the correlation between two signals using adaptive filtering. It will be appreciated that a correlation, or similarity between two signals can also be determined by directly using the cross-correlation function. A brief description of adaptive filtering is provided below.

Figure 3:
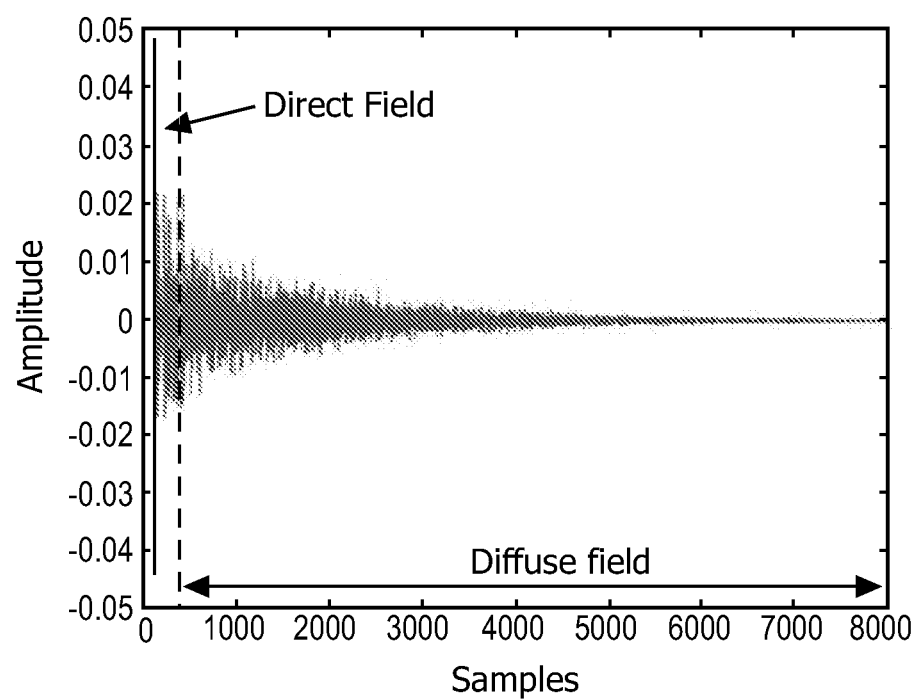
FIG. 3 is a graph illustrating the acoustic impulse response in a room showing the direct and diffuse fields.

An adaptive filter is used to remove a correlated signal present in another signal, and is commonly used for acoustic echo cancellation. In acoustic echo cancellation, the adaptive filter models the linear part of the acoustic echo path between a speaker of a device and a microphone so that the (linear) acoustic echo can be removed from the microphone signal, leaving only the desired clean speech signal. If modeled correctly, the adaptive filter coefficients correspond to the acoustic echo path as shown in FIG. 3, and can be divided into a direct field which corresponds to the direct coupling between speaker and microphone and some early reflections, and the diffuse field which corresponds to the later reflections, and which contribute to reverberation. FIG. 3 shows the acoustic impulse response in a room with a high reverberation time (approximately 850 ms), showing the direct and diffuse fields. The y-axis represents the waveform's amplitude and the x-axis shows the discrete time samples for an impulse response sampled at 8 kHz.

Numerous adaptive filtering algorithms exist such as the least-mean-square (LMS) and normalized LMS (NLMS), which are based on Wiener filter theory, and recursive least squares (RLS) and Kalman filtering. In the following embodiments, Wiener filter theory will be used to derive the optimum adaptive filter coefficients.

Figure 4A:
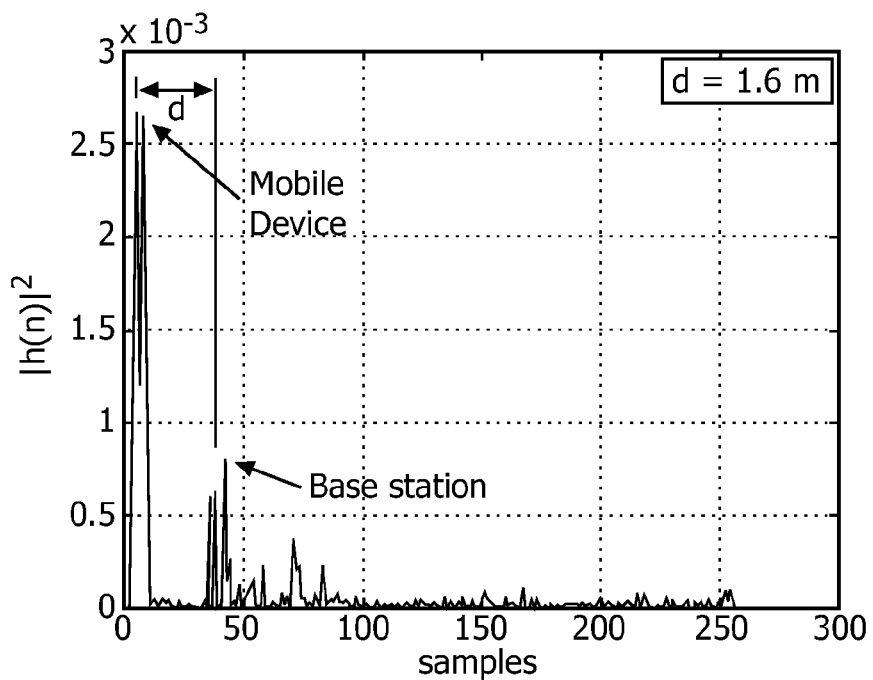
FIGS. 4A-B show an adaptive filter impulse response for a user standing two different distances from a base unit.
Figure 4B:
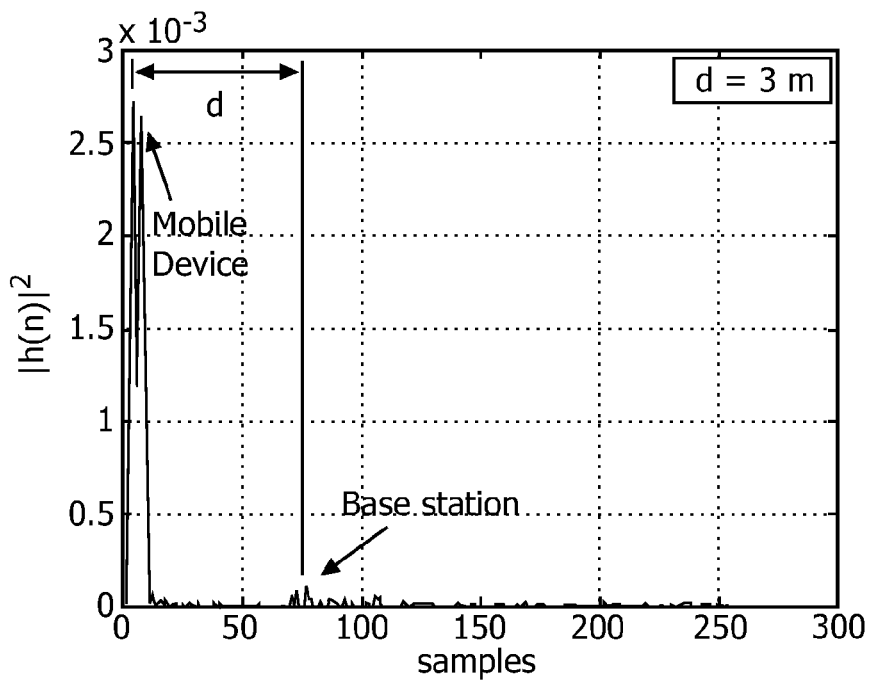

The top graph in FIG. 4 shows the squared-magnitude adaptive filter impulse response for a user standing near (e.g. 1.6 m) to a receiving device (e.g. a base unit 8), and the bottom graph FIG. 4 shows the squared-magnitude adaptive filter impulse response for a user standing further away (e.g. 3 m) from a receiving device (e.g. a base unit 8). The large peaks at the beginning of the impulse response correspond to the acoustic path between the speaker 16 and microphone 18 in mobile device 6, while the second set of delayed peaks correspond to the acoustic path between speaker 28 in base unit 8 and microphone 18 in mobile device 6.

For a so-called dry room with a low reverberation time, the diffuse part of the impulse response is much lower in power compared to the direct field. Furthermore, the closer a sound source (e.g. a user's mouth) is located to the receiving device (e.g. a base unit), the larger the ratio between the intensity in the direct and diffuse field. At the reverberation radius or critical distance around the receiving device, the intensity of the direct field equals that of the diffuse field. Outside of this radius, only diffuse contributions are present, and intelligibility of speech picked up by the microphone in the base unit drops considerably. This is a problem that radio (i.e. RF)-based distance detection solutions cannot take into account.

Figure 5:
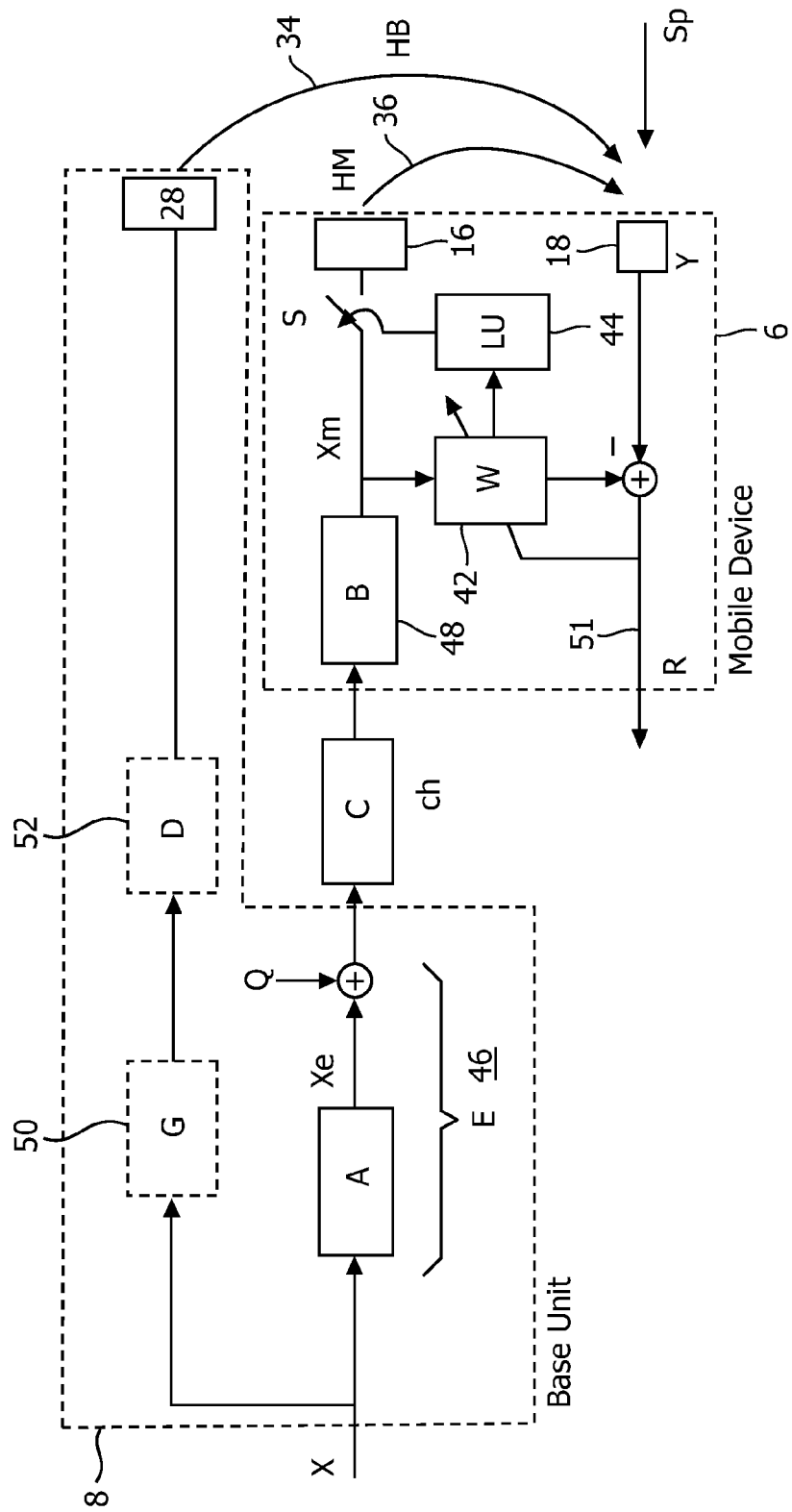
FIG. 5 is a diagram illustrating the processing performed in a first embodiment of the invention.
Figure 6:
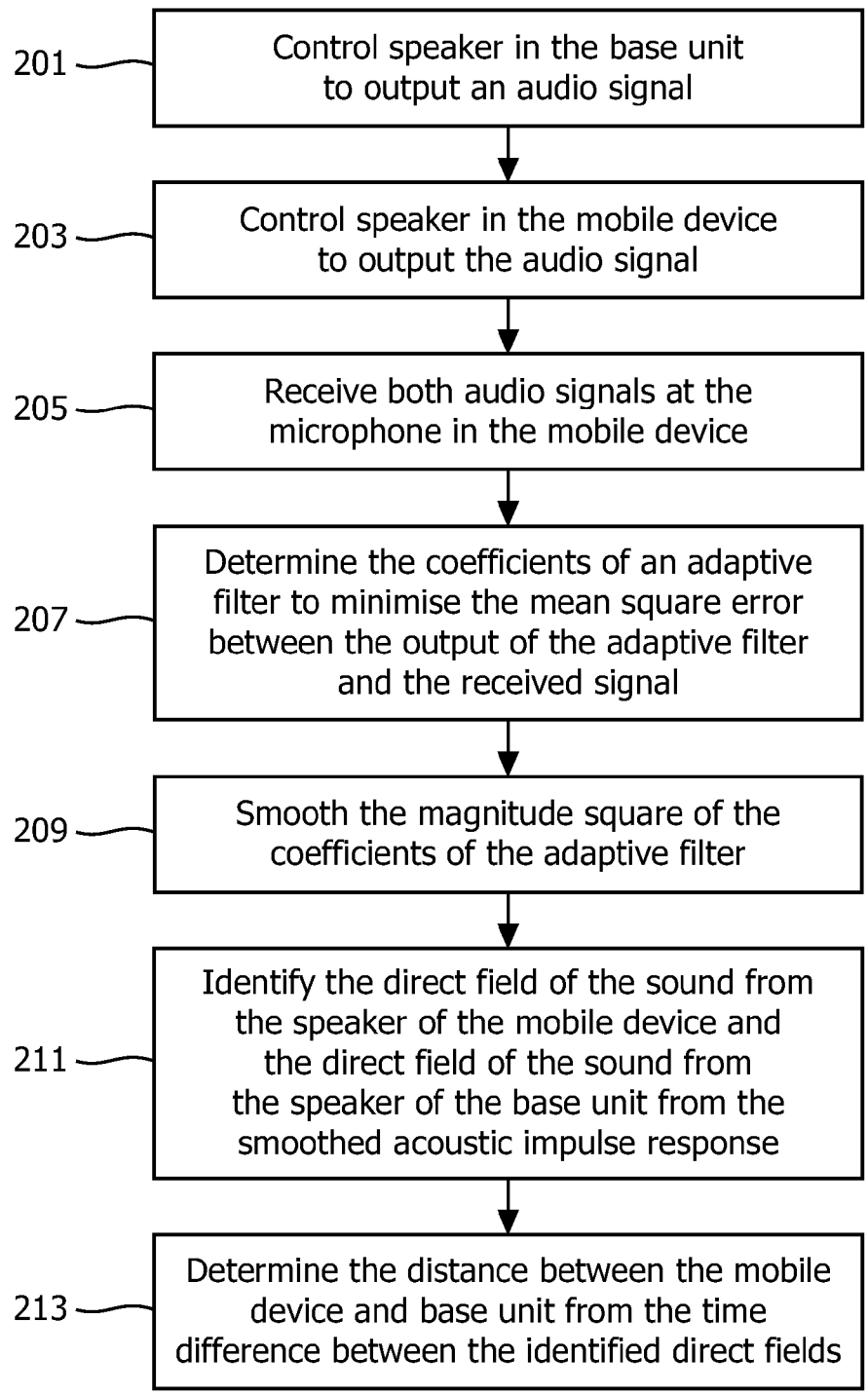
FIG. 6 is a flow chart illustrating the processing steps performed in the first embodiment.

A diagram illustrating the processing in a first embodiment of the invention is shown in FIG. 5. A flow chart showing the corresponding method of determining the proximity between a mobile device 6 and a base unit 8 is shown in FIG. 6.

In the first embodiment of the invention, an adaptive filter is combined with a peak detection scheme to determine the distance between a user (with a mobile device 6) and a base unit 8 using, preferably, two sets of two signals. The first embodiment is based on using audio output from the speaker 28 in the base unit 8 (i.e. a far-end acoustic signal or an acoustic signal generated from an audio file stored in the memory 31 of the base unit 8) as shown in step 113 of FIG. 2.

In particular, the proximity detection is based on an echo signal produced by the speaker 16 of the mobile device 6 as detected by the microphone 18 in the mobile device 6 (the direct field of this signal is associated with a strong coupling between the speaker 16 and microphone 18 and a short delay) and an echo signal produced by the speaker 28 in the base unit 8 as detected by the microphone 18 in the mobile device 8 (this echo is associated with a coupling that depends on the distance between the mobile device 6 (i.e. user) and the base unit 8). The delay of the second echo signal relative to the direct field of the first echo signal is proportional to the distance between the mobile device 6 and base unit 8.

In this first embodiment, the processing performed according to the invention is preferably performed by the processor 14 in the mobile device 6, although it will be appreciated that the processing could instead be performed by the processor 26 in the base unit 8.

FIG. 5 shows the first embodiment in the frequency domain (with frequency ω). The processing by the processor 14 consists of an adaptive filter 42 between the speaker 16 of the mobile device 6 and its microphone 18, and a logic unit 44 which calculates the distance between the user 4 (mobile device 6) and base station 8.

To understand the effects of the wireless encoding/decoding process between the mobile device 6 and base unit 8 on the resulting adaptive filter solution, a mathematical model of the speech encoder 46 and decoder 48 used to transmit the speech signal from base station 8 to mobile device 6 is included (this speech encoder 46 would be implemented by the processor 26 in the base unit 8 and the decoder 48 by the processor 14 in the mobile device 6). The encoding operation can be modeled as a time-variant filtering and quantization operation. Apart from the channel delay in the wireless channel between the base unit 8 and mobile device 6 which can be compensated by an acoustic echo canceller, packet-loss and other nonlinear distortions in the wireless channel are disregarded for the purpose of this analysis.

In FIG. 5, the far-end signal data as received at the base unit 8 from the remote monitoring station (or the stored audio file) is denoted by $X(\omega)$ which is output by the speaker 28 of the base station 8 as an acoustic signal (step 201 in FIG. 6). The far-end signal data is also wirelessly transmitted to the mobile device 6 after which encoding and transmission through the wireless channel ($C(\omega)$), is decoded, and is output by the speaker 16 in the mobile device 6 as an acoustic signal (step 203 in FIG. 6)

$$X_m(\omega) = [X(\omega)A(\omega) + Q(\omega)]C(\omega)A^{-1}(\omega) \quad (1)$$

where $A(\omega)$ and $Q(\omega)$ model the effects of the encoder, and $A^{-1}(\omega)$ models the decoder.

Assuming an ideal situation with $Q(\omega)=0$ and $C(\omega)=e^{-j\omega\delta}$, where $\delta$ is the transmission delay, the acoustic signal generated by the microphone 18 in the mobile device 6 (step 205) is given by $$Y(\omega) = X(\omega)[H_b(\omega) + H_m(\omega)e^{-j\omega\delta}] \quad (2)$$

The optimum weights $W(\omega)$ for a minimum mean-square error (MMSE) criterion is $$W(\omega) = H_b(\omega) + H_m(\omega)e^{-j\omega\delta} \quad (3)$$

which consists of the sum of the acoustic echo path from the speaker 28 in the base station 8 to the microphone 18 in the mobile device 6 plus a delayed version of the acoustic coupling between the speaker 16 and microphone 18 in the mobile device 6. Usually the RF delay associated with the channel is much smaller than the propagation delay of sound, and it will therefore be assumed to be negligible, i.e. $C(\omega)=1$ (however the signal processing associated with encoding and decoding the signal will be larger than the propagation delay). Therefore, the ideal solution for $W(\omega)$ simply consists of the sum of the two echo paths. In addition, since the gains of the amplifiers driving the individual speakers 16, 28 are not explicitly included in the model, it is instead assumed to be part of the echo path impulse responses.

Under normal conditions, however, the encoder 46 introduces distortion in the form of quantization noise $Q(\omega)$ which can be modeled (at high rates) as zero-mean statistically independent additive white noise with power $$\sigma_Q^2 = G\sigma_{x_e}^2 \quad (4)$$

which means that the quantized noise power follows the power of the decorrelated signal $X_e$. The factor G is related to the quantization SNR.

The far-end signal data (or audio file data) is used to determine coefficients for the adaptive filter 42 to minimize the mean square error between the output of the adaptive filter 42 and the received signal $Y(\omega)$ (step 207).

An optimum solution of the adaptive filter weights can be derived as follows (with an assumption that the user 4 is not talking and contributing audio to the received signal $Y(\omega)$:

Following equation (1) and the assumption that $C(\omega)=1$, the signal output by the speaker 16 in the mobile device 6 is given by $$X_m(\omega) = [X(\omega)A(\omega) + Q(\omega)]A^{-1}(\omega) \quad (5)$$
$$= X(\omega) + Q(\omega)A^{-1}(\omega) \quad (6)$$

where the effective quantization noise is given by $X_Q(\omega) = Q(\omega)A^{-1}(\omega)$.

The signal received by the microphone 18 in the mobile device 6 is given by $$Y(\omega) = X(\omega)H_b(\omega) + X_m(\omega)H_m(\omega) \quad (7)$$
$$= X(\omega)[H_b(\omega) + H_m(\omega)] + Q(\omega)A^{-1}(\omega)H_m(\omega) \quad (8)$$
$$= X(\omega)[H_b(\omega) + H_m(\omega)] + X_Q(\omega)H_m(\omega) \quad (9)$$

where the last term represents the echo of the quantization noise of the input signal.

The optimum weights $W(\omega)$ to minimize the mean square error (MSE) between the filter output 42 and acoustic signal received at the microphone 18 is given by the Wiener solution $$W_{opt}(\omega) = \frac{E\{X_m^*(\omega)Y(\omega)\}}{E\{X_m^*(\omega)X_m(\omega)\}} \quad (10)$$

The denominator in (10), which denotes the power spectral density (PSD) of the speaker 16 of mobile device 6 can be expanded as $$E\{X_m^*(\omega)X_m(\omega)\} = \quad (11)$$
$$E\{X^*(\omega)X(\omega)\} + \frac{\sigma_Q^2}{|A(\omega)^2|} \approx \Phi_{XX}(\omega) + \frac{\sigma_Q^2}{\sigma_{X_e}^2}\Phi_{XX}(\omega) =$$
$$(G+1)\Phi_{XX}(\omega)$$

The cross-correlation in the numerator of (10) can be simplified as $$\Phi_{XX}(\omega)[H_b(\omega) + H_m(\omega)] + E\{X^*(\omega)X_Q(\omega)\}H_m(\omega) + \quad (12)$$
$$E\{X_Q^*(\omega)X(\omega)\}[H_b(\omega) + H_m(\omega)] + E\{X_Q^*(\omega)X_Q(\omega)\}H_m(\omega) =$$
$$\Phi_{XX}(\omega)[H_b(\omega) + H_m(\omega)] + E\{X^*(\omega)X_Q(\omega)\}H_m(\omega) +$$
$$E\{X_Q^*(\omega)X(\omega)\}[H_b(\omega) + H_m(\omega)] + G\Phi_{XX}(\omega)H_m(\omega)$$

Looking back at (10), if there is no correlation between the speaker signal 16 and the microphone signal 18 over all frequencies, then the Wiener solution is zero.

The expectations of the second and third term are zero since $$E\{X^*(\omega)X_Q(\omega)\} = E\{X^*(\omega)Q(\omega)\}A^{-1}(\omega) \quad (13)$$
$$= \frac{\sigma_{X_e}^2 E\{Q(\omega)\}}{|A(\omega)|^2} \quad (14)$$
$$= 0 \quad (15)$$

The simplification of the last term follows from (11). The resulting Wiener solution is given by $$W_{opt}(\omega) = H_m(\omega) + \frac{H_b(\omega)}{G+1} \quad (16)$$

Thus, returning to FIGS. 5 and 6, the better the signal to noise ratio (SNR) of the quantizer, the smaller the value of G in equation 16, and the closer the Wiener solution is to the sum of the two impulse responses. This essentially means that the poorer the quantizer, the more difficult it is to find the difference in the time of arrival between the two echoes. To compensate for this, a gain factor of G+1 can be applied to the far-end signal as shown by block 50 in the upper branch of FIG. 5, although this is usually not necessary since the gain applied at the base unit 8, which houses a much larger speaker 28, is much higher than that of the gain applied to the speaker 16 in the mobile device 6.

A least-mean square algorithm like the NLMS can be used to update the adaptive filter coefficients and track changes in the optimum Wiener solution. This adaptation is carried out by correlating the input signal of the adaptive filter with the residual signal 51. The NLMS coefficient update recursion is given by $$\underline{w}(n+1) = \underline{w}(n) + \frac{\mu}{\|\underline{x}(n)\|_2^2} \underline{x}(n)r(n) \quad (17)$$

where $\underline{w}(n)$ and $\underline{w}(n+1)$ represent the current and updated time-domain filter coefficients of length M, $\mu$ the adaptation step size ($\mu<1$), $\underline{x}(n)$ the input vector containing the current M input samples, and r(n) the residual signal. The second term in (17) contains the cross-correlation between the input and residual signal. It is assumed that M is long enough to model the acoustic path. For a stationary environment, the filter coefficients in (17) converge to the optimum solution when $\underline{x}(n)r(n) \approx 0$.

Regarding the channel delay and delay caused by signal processing (i.e. the encoding and decoding), too much of a delay might influence the accurate estimation of the time difference between $H_m$ and $H_b$ since this results in a Wiener solution with $H_m$ delayed by an amount equal to the group delay of the processing plus channel delay. Therefore, a compensation delay can be applied to the output of speaker 28, as shown by block 52 in the upper branch of FIG. 5.

As the Wiener solution has been expressed in terms of the individual acoustic echo paths between the speaker 16 and microphone 18 of the mobile device 6, the logical unit 44 (processor 14) determines whether the mobile device 6 is proximate to the base unit 8 (and therefore, in a preferred embodiment, whether to switch off the speaker 18 of the mobile device 6).

In particular, the logic unit 44 examines the energy in the acoustic impulse response (for example as shown in FIG. 3), and locates the direct field associated with the speaker 16 in the mobile device 6 and the direct field of the echo path associated with the speaker 28 in the base unit 8 (step 211 in FIG. 6).

Figure 7:
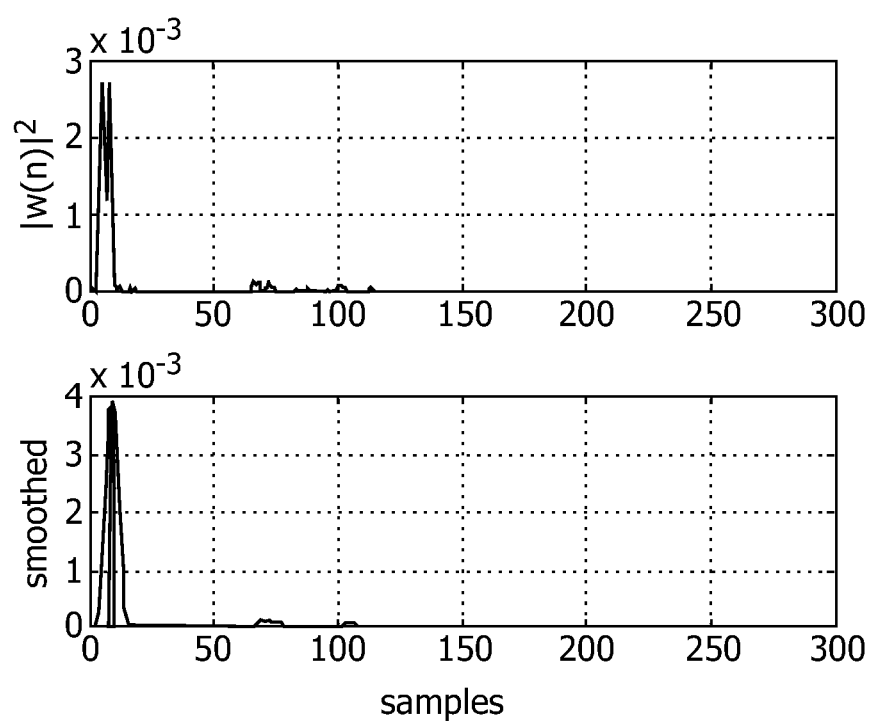
FIG. 7 is a graph illustrating the magnitude squared of the impulse response of an adaptive filter and a corresponding smoothed response.

Preferably, prior to step 211, the magnitude square of the coefficients of the adaptive filter are smoothed. In the following, a moving average (MA) filter is used to smooth out the magnitude square of the adaptive filter's coefficients. This finite impulse response filter (FIR) is given by $$\frac{1}{\sqrt{N}}[1 1 \ldots 1] \quad (18)$$

where N is the length of the filter. The longer the filter, the more smoothing and spreading there is of the impulse response of the adaptive filter. The value of N can be set depending on the practical considerations of the smallest conceived distance between the mobile device 6 and the base unit 8. At 8 kHz, one sample corresponds to 125 µs, the time required for sound to travel 4.3 cm. Preferably, N can be set between 4 and 12 samples (corresponding to distances of 17 and 50 cm) to prevent false detections. Selecting a value for N that is too large results in smearing of the magnitude squared impulse response. FIG. 7 shows the smoothed magnitude squared impulse response of the adaptive filter 42.

The logic unit 44 can locate the direct field associated with the speaker 16 in the mobile device 6 and the direct field of the echo path associated with the speaker 28 in the base unit 8 in step 211 of FIG. 6 by identifying local maxima in the smoothed magnitude impulse response, i.e. those samples with a magnitude larger than both left and right neighboring samples, i.e.

$$y_n \geq y_{n-1} \text{ and } y_n \geq y_{n+1} \quad (19)$$

The second largest local maxima can be taken as corresponding to the impulse response of the echo path ($H_b$) from the base unit 8. The distance d between this and the global maximum (i.e. the echo path $H_m$ from the speaker 16 of the mobile device 6) corresponds to the sample distance between the mobile device 6/user 4 and the base unit 8 (step 213 in FIG. 6). This distance is then converted to the distance in meters according to $$D = \frac{d}{f_s}c \quad (20)$$

where $f_s$ is the sampling frequency in Hz and c the speed of sound in air in $ms^{-1}$ (which is approximately 343 $ms^{-1}$). In the example shown in FIG. 7, the distance is calculated to be 64×343/8000=2.75 m.
Depending on this value, $$Sw=1 \text{ (i.e. speaker 16 switched on), if } D \geq Th1 \quad (21)$$

$$Sw=0 \text{ (i.e. speaker 16 switched off), if } D < Th1 \quad (22)$$

where Th1 is some threshold distance, e.g. Th1=3 m. It will be appreciated that there are other methods for identifying peaks in the total impulse response for determining the distance between the direct field associated with the speaker 16 in the mobile device 6 and the direct field of the echo path associated with the speaker 28 in the base unit 8.

Furthermore, the magnitude of the second largest maximum corresponding to the echo path impulse response from the speaker 28 in the base unit 8 compared to that of the global maximum can be used as another measure (or in conjunction with the distance measure), i.e.

$$Sw=0 \text{ (i.e. speaker 16 switched off), if } p_2/p_{max} \geq Th2 \quad (23)$$

$$Sw=1 \text{ (i.e. speaker 16 switched on), otherwise} \quad (24)$$

where Th2 is some threshold that depends on the speaker amplifier gain of the base unit 8, and is preferably less than unity, $p_{max}$ is the magnitude of the global maximum and $p_2$ is the amplitude of the second largest maximum. The threshold Th2 can be determined experimentally based on the amplifier settings for speakers 16 and 28. Unlike the distance measure, this measure takes into account the quality of the acoustic path between user 4 and mobile device 6 and the base unit 8, i.e. if there are acoustic energy losses due to reflections and reverberation.

It will be appreciated that there are other measures to assess the acoustic quality between user 4 and mobile device 6 and the base unit 8, such as using the dispersion of the impulse response around the second peak as a measure of the amount of reverberation. This dispersion can be based on a localized sparseness measure such as $$\frac{N - \sqrt{N}}{\sqrt{N}} \left( 1 - \frac{\|w\|_1}{\sqrt{N} \|w\|_2} \right), \quad (25)$$

where N is the length of the analysis window around the second peak and w the filter coefficients within that analysis window. The $\|\cdot\|_1$ and $\|\cdot\|_2$ represent the 1- and 2-vector norms, respectively. A second measure that can be used is the estimation of the reverberation time or T60 of the impulse response around the second peak. T60 denotes the reverberation time which is defined as the time it takes the energy in the diffuse field of the echo to decay by 60 dB. So, in a highly reverberant room this time will be quite long (near 1 sec, like the impulse response in FIG. 3), but for a dry room, this is usually less than 350 ms. T60 is measured by analyzing the impulse response and so-called energy decay curve (EDC).

It will be appreciated that the above discussion of this first embodiment assumes that the speaker 16 of the mobile device 6 is switched on, and the impulse response corresponding to the echo from the base unit 8 is given by the second largest maximum in the smoothed magnitude squared response of the adaptive filter 42.

If, however, the speaker 16 of the mobile device 6 is off (either by default or following an earlier decision to switch the speaker 16 off) while the processing is taking place, then the impulse response corresponding to the base unit 8 is given by the global maximum in the smoothed magnitude squared response of the adaptive filter 42. This can be a more robust solution to the problem. In this case, the mobile device 6 still receives the far-end signal data over the wireless connection between the mobile device 6 and base unit 10 (or already has the audio file stored in its memory 21), and uses this signal or file in the processing steps as described above. The position of the global maximum is converted to a distance without the reference point derived from the echo path from the speaker 16 by instead using the first filter-tap as a reference point. This is acceptable since the speaker 16 of the mobile device 6 is so close to the microphone 18 that the first local peak is in any case usually located within the first few adaptive filter coefficients. In addition, when the speaker 16 is switched off, the power measure with Th2 can't be used, but the distance and dispersive measure can still be used.

In either case, (i.e. whether the speaker 16 and associated components are switched on or off), the processing can adaptively run in the background during a call as long as the microphone 18 in the mobile device 6 is on.

In the case where the output from the speaker 28 is generated from the stored audio file, the above processing differs in that the encoder 46 and decoder 48 are not required, so $Q(\omega)=0$ and $A(\omega)=1$. In this implementation of the first embodiment, when a call is initiated, a trigger signal can be sent from the mobile device 6 to the base unit 8 that causes the base unit 8 to start the call and play the pre-recorded audio file from memory 31. At the same time, the audio file is extracted from the memory 21 in the mobile device 6 and fed into the adaptive filter (in this implementation, outputting the audio file through the speaker 16 of the mobile device 6 is again not always required, as in the embodiment described above). Outputting the audio file in this way provides the most efficient implementation of the first embodiment of the invention, in terms of the amount of signaling required between the mobile device 6 and the base unit 8 to establish the call and the processing required to determine the proximity or acoustic quality.

It will also be appreciated that it is possible for the far-end signal to be provided directly to the mobile device 6 as well as the base unit 8, in which case the processing is similar to the stored audio file embodiment described in the preceding paragraph.

Although this first embodiment has been described with reference to the analysis of an acoustic signal received from the speaker 28 in the base unit 8 at the microphone 18 of the mobile device 6 (the acoustic signal either being from a far-end source or a stored audio file), along with the acoustic signal received from the speaker 16 in the mobile device 6 (when the speaker 16 is active), it will be appreciated that the distance or acoustic quality between the mobile device 6 and base unit 8 could instead be determined by analyzing the acoustic signal received at the microphone 18 of the mobile device 6 from the base unit 8 and the corresponding audio signal output by the speaker 28 in the base unit 8 and received by the microphone 30. As appreciated by those skilled in the art, the processing required in these implementations will be generally similar to that described in the preceding paragraphs.

In a yet further modification to the first embodiment, the distance between the mobile device 6 and base unit 8 could be determined by analyzing an acoustic signal received at the microphone 30 in the base unit 8 that has been output by the speaker 16 in the mobile device 6 and, optionally, along with the same acoustic signal received at the microphone 18 in the mobile device 6 from its speaker 16 or the same acoustic signal received at the microphone 30 in the base unit 8 that has been output by its speaker 28. Again, as appreciated by those skilled in the art, the processing required in these implementations will be generally similar to that described in the preceding paragraphs. However, these implementations are less preferred since the audio output by the speaker 16 in the mobile device 6 is generally not as loud as the audio output by the base unit 8 (due in part to power and size constraints, as well as the fact that the mobile device 6 is likely to be close to the user 4 when in use), and therefore the peaks in the signals received at the base unit 8 are not likely to be as strong.

Figure 8:
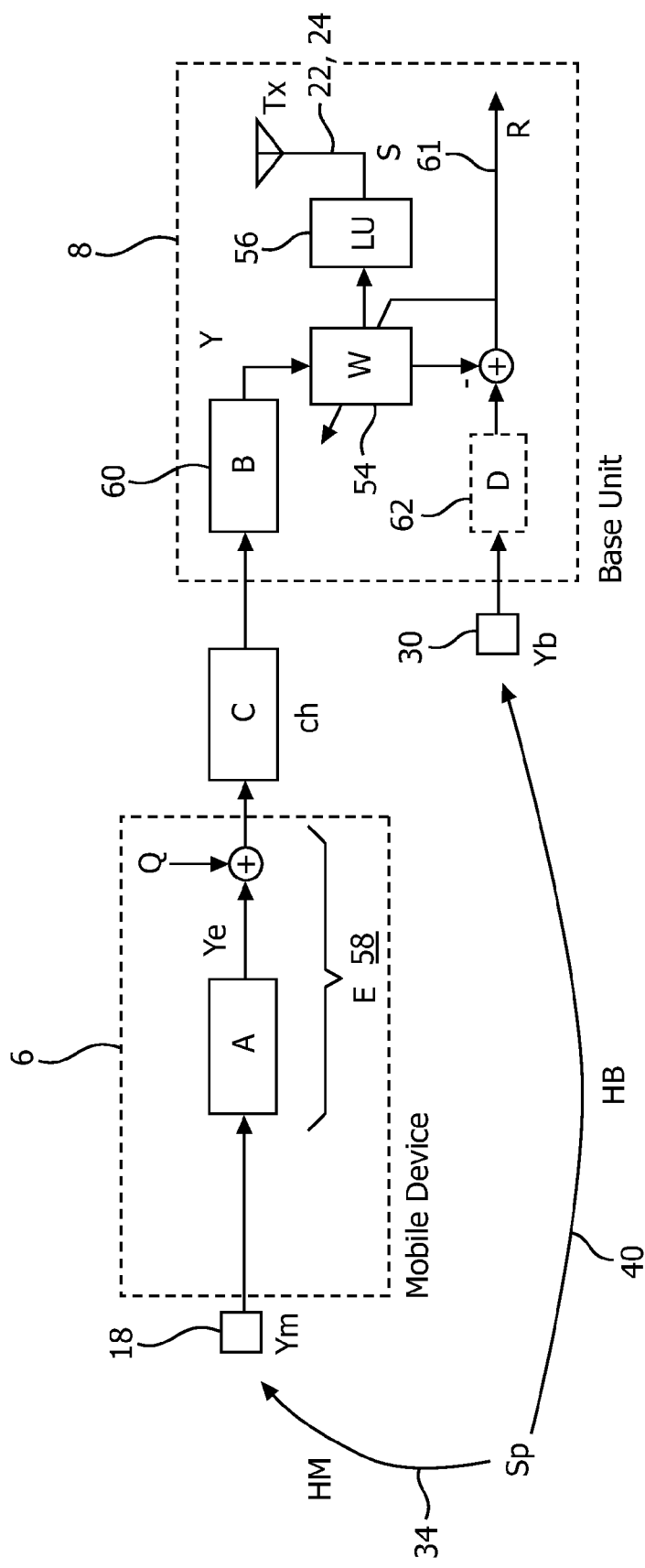
FIG. 8 is a diagram illustrating the processing performed in a second embodiment of the invention.
Figure 9:
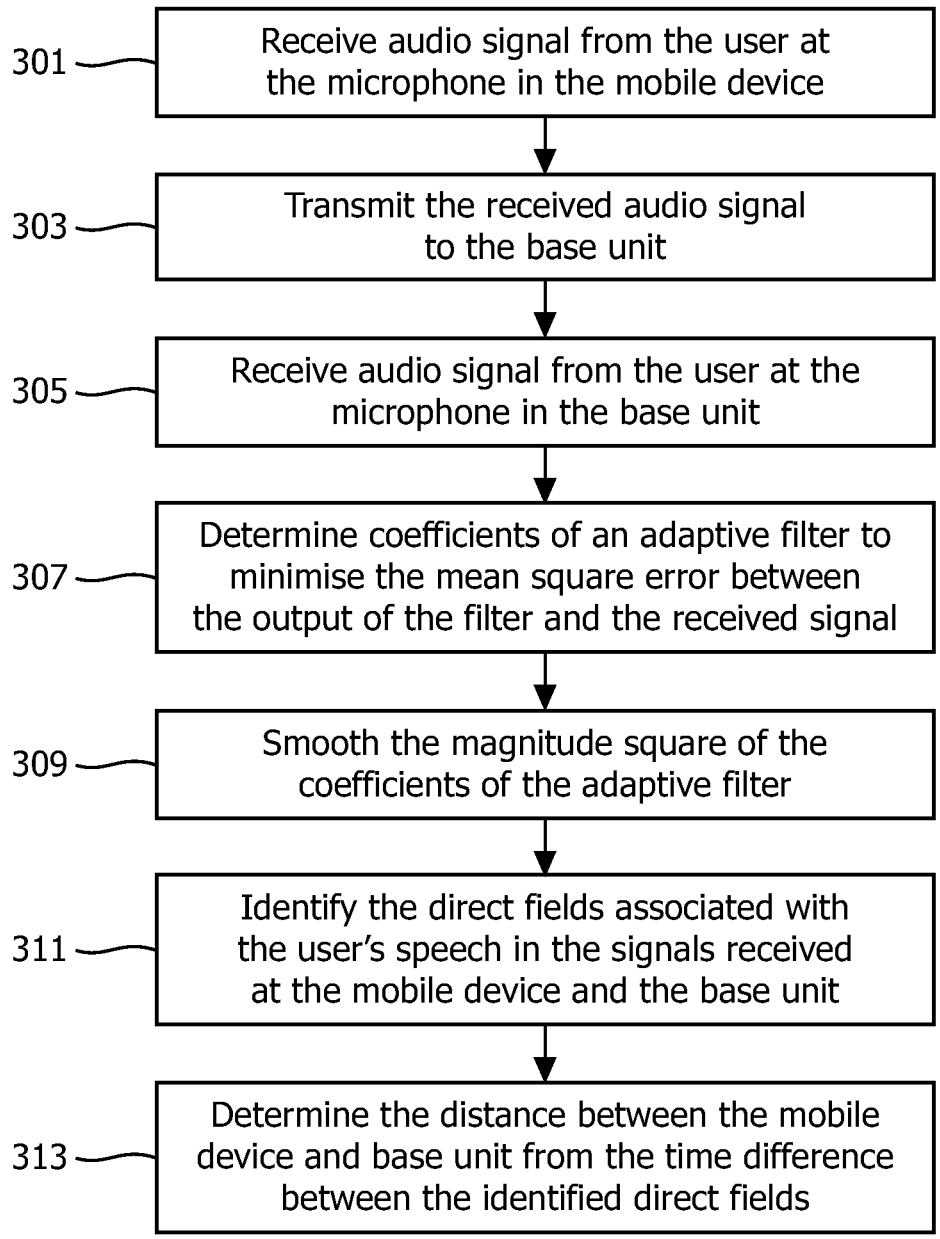
FIG. 9 is a flow chart illustrating the processing steps performed in the second embodiment.

A diagram illustrating the processing in a second embodiment of the invention is shown in FIG. 8. A flow chart showing the corresponding method of determining the proximity between a mobile device 6 and a base unit 8 is shown in FIG. 9.

In the second embodiment of the invention, an adaptive filter is again combined with a peak detection scheme to determine the distance between the user 4 (with mobile device 6) and the base unit 8 using two sets of two signals. The second embodiment is based on using the near-end signal as shown in step 115 of FIG. 2.

In particular, the proximity detection is based on a signal produced by the speech of the user 4 of the mobile device 6 as detected by the microphone 18 in the mobile device 6 (the direct field of this signal is associated with a strong coupling between the user 4 and microphone 18 and a short delay) and the same signal produced by the speech of the user 4 at the microphone 18 in the base unit 8 (this signal is associated with a coupling that depends on the distance as well as the acoustic environment between the user 4 (i.e. mobile device 6) and the base unit 8). The delay of the second signal relative to the direct field of the first signal is proportional to the distance between the mobile device 6 and base unit 8.

In this second embodiment, the processing performed according to the invention is preferably performed by the processor 26 in the base unit 8, although it will be appreciated that the processing could instead be performed by the processor 14 in the mobile device 6.

This embodiment of the invention does not make use of the speaker 16 in the mobile device 6, so it does not matter whether the speaker 16 is powered or not.

The microphone 18 in the mobile device 6 detects audio (i.e. speech), S(ω), from the user 4 (step 301 in FIG. 9) and transmits the received audio signal X(ω) to the base unit 8 via a channel C(ω) (step 303).

The microphone 30 in the base unit 8 also detects the same audio (i.e. speech), S(ω), from the user 4 (step 305).

The processing by the processor 26 consists of an adaptive filter 54 and logic unit 56 for calculating the delay between the signals arriving at the microphone 18 of the mobile device 6 and the microphone 30 of the base unit 8.

Similarly, a model 60 of the speech encoder 58 used to transmit the speech signal X(ω) from the mobile device 6 to the base station 8 is included to aid with the analysis (this speech encoder 58 would be implemented by the processor 14 in the mobile device 6 and the decoder 60 would be implemented by the processor 26 in the base unit 8). As in the first embodiment, the encoding operation can be modeled as a time-variant filtering and quantization operation, and apart from the channel delay in the wireless channel between the mobile device 6 and base unit 8 which can be compensated by an acoustic echo canceller, packet-loss and other nonlinear distortions in the wireless channel are disregarded for the purpose of this analysis.

The processing is performed in a similar way to the first embodiment, i.e. the coefficients of an adaptive filter are determined to minimize the mean square error of the signals (step 307), the magnitude square of the coefficients is optionally smoothed (step 309), the direct fields associated with the user's speech in each of the received signals are identified (step 311) and the distance between the mobile device 6 and base unit 8 is determined from the identified direct fields (step 313).

In particular, the optimal solution for the adaptive filter weights in the MMSE sense is given by the Wiener solution, $$W_{opt}(\omega) = \frac{E\{X_b^*(\omega)Y(\omega)\}}{E\{X_b^*(\omega)X_b(\omega)\}} \tag{26}$$

where $$X_b(\omega) = X(\omega) + X_Q(\omega) \tag{27}$$

$$Y(\omega) = S(\omega)H_b(\omega) = X(\omega)\frac{H_b(\omega)}{H_m(\omega)} \tag{28}$$

The numerator and denominator in (26) can further be simplified to $$E\{X_b^*(\omega)Y(\omega)\} = \Phi_{XX}(\omega)\frac{H_b(\omega)}{H_m(\omega)} \tag{29}$$

$$E\{X_b^*(\omega)X_b(\omega)\} = (G+1)\Phi_{XX}(\omega) \tag{30}$$

respectively, where G is the factor related to the quantization SNR. The resulting Wiener solution is therefore, $$W_{opt}(\omega) = \frac{H_b(\omega)}{(G+1)H_m(\omega)} \tag{31}$$

Consider the free-field scenario where the transfer functions $H_b(W)$ and $H_m(\omega)$ are mere delays, i.e.

$$H_b(\omega) = e^{-j\omega\delta^1} \tag{32}$$

$$H_m(\omega) = e^{-\omega\delta^2} \tag{33}$$

where it is assumed that $\delta_1 > \delta_2$, then $$W_{opt}(\omega) = (G+1)^{-1}e^{-j\omega(\delta^1-\delta^2)} \tag{34}$$

which corresponds to a delayed impulse at time $t=\delta_1-\delta_2$. If the processing delay for the encoder 58 and decoder 60 is compensated by inserting a delay 62 in the microphone path of the base unit 8, then $\delta_2$ can be assumed to be zero, and the location of the peak in the time-domain impulse response gives an estimate of the sample distance between the user 4 and the base unit 8.

The distance between the user 4 and base unit 8 can be compared to a threshold distance Th3 (which may be the same as Th1) and, depending on this value $$Sw=1 \text{ (i.e. speaker 16 switched on), if } D \geq Th3 \tag{35}$$

$$Sw=0 \text{ (i.e. speaker 16 switched off), if } D < Th3 \tag{36}$$

As in the first embodiment, the acoustic quality of the speech can be determined from the acoustic impulse response. This can be based on equations 23, 24 and 25 set out above.

It will be appreciated that this second embodiment can also be implemented by directly computing the cross-correlation between time-domain signals Yb and Y in FIG. 8, $$C_{yy_b}(\tau) = \frac{1}{N-\tau}\sum_{\tau}^{N} y(n)y_b(n-\tau) \tag{37}$$

for sample delay τ<N. Those skilled in the art are aware there are numerous other ways to calculate the cross-correlation between two signals.

As indicated above, the method in FIG. 2 can operate using an analysis of both the far-end and near-end signals as each signal becomes active, and the proximity decision can be taken on the basis of the result of both measurements. For example, if one embodiment outputs Sw=1 (i.e. switch speaker 16 on) and the other embodiment determines that Sw=0 (i.e. switch speaker 16 off), then the final decision in view of this uncertainty can be to keep the speaker 16 in the mobile device 6 switched on.

In a modification to the first and second embodiments described above, where there are bandwidth constraints on the wireless channel between the mobile device 6 and base unit 8, for example that prevent the transmission of audio sampled at 8 kHz between the mobile device 6 and base unit 8, the acoustic signal can be transformed to a coarser representation in both mobile device 6 and base unit 8. This representation should preserve timing cues for determining the distance between the mobile device 6 and base unit 8, but can also transmit other features relating to the properties of the signal to determine the degradation in acoustic quality caused by the acoustic path or distance between the mobile device 6 and base unit 8.

Representations that preserve important timing cues of the signal and that still make use of the adaptive filtering operation include smoothing of the signal in the form of rectification and computing the envelope of the signal. This operation can also be followed by an anti-aliasing filter and down-sampling the signal to reduce the number of transmitted samples per second. In these embodiments, the transmitted speech signal might not be usable for transmission to the far-end response centre. Those skilled in the art will be aware of alternative signal representations that preserve important time-domain characteristics that can be used to determine the distance and acoustic quality between the mobile device 6 and base unit 8.

Signal representations that can be used to determine the acoustic quality between mobile device 6 and base unit 8 are related to the energy in the signals, or higher order statistical moments. These can be transmitted less often than and compared in either mobile device 6 or base unit 8.

It will be appreciated that the processing performed according to the embodiments of the invention can be implemented using hardware or software, or a combination of both.

There is therefore described an alternative approach to RF-based methods for determining the proximity of a mobile device 6 (and a user 4) to a base unit 8, that, in preferred embodiments, allows a decision to be made regarding the operation of the speaker 16 of the mobile device 6 during a communication after assessing the ability of the user 4 to hear and perceive the speech from the speaker 28 in the base unit 8.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining the distance and/or acoustic quality between a mobile device having a microphone and a speaker and a base unit comprising a microphone and a speaker, wherein the mobile device is configured to wirelessly communicate with the base unit and the base unit is configured to connect to a remote monitoring station via a communication network, the method comprising:

receiving an acoustic signal by a microphone in one of said mobile device and base unit;

with a processor:

determining coefficients of an adaptive filter for removing a second signal from the received acoustic signal, the second signal corresponding to (a) an acoustic signal received by the microphone in the other one of said mobile device and base unit, or (b) a control signal used to control the speaker in the other one of said mobile device and base unit to output the acoustic signal, and determining the acoustic quality and/or the distance between the mobile device and the base unit based the determined coefficients.

2. The method as claimed in claim 1, wherein the acoustic signal received by the microphone in said one of said mobile device and base unit is received from the speaker in the other one of said mobile device and base unit, wherein the speaker outputs the acoustic signal in response to a control signal.

3. The method as claimed in claim 2, the method further comprising the step of:

controlling the speaker in said one of said mobile device and base unit to also output the acoustic signal;

wherein the step of receiving an acoustic signal by the microphone in one of said mobile device and base unit comprises receiving the acoustic signal from the speaker in said mobile device and said base unit.

4. The method as claimed in claim 3, wherein the step of determining the acoustic quality and/or the distance between the mobile device and the base unit comprises:

detecting a first peak in the result of the step of determining corresponding to the acoustic signal from the speaker in said one of said mobile device and base unit and a second peak corresponding to the acoustic signal from the speaker in said other one of said mobile device and base unit and determining the distance between the mobile device and the base unit from the distance between the first and second peaks in the result of the step of determining; and/or determining the acoustic quality between the mobile device and the base unit from (i) the ratio of the magnitudes of the detected peaks; (ii) the dispersion around the second peak; and/or (iii) the reverberation time around the second peak.

5. The method as claimed in claim 2, wherein the step of determining the acoustic quality or distance comprises determining the acoustic quality between the mobile device and the base unit from (i) a dispersion around a detected peak; and/or (ii) a reverberation time around a detected peak.

6. A method of reducing power consumption of a mobile device having a microphone, a speaker, and an RF transmitter and receiver, the mobile device being configured to wirelessly communicate via the RF transmitter and receiver with a base device, the base device having a microphone, a speaker, and an RF transmitter and receiver which is configured to communicate with the mobile device RF transmitter and receiver and with a remote monitoring station, the method comprising:

with the microphone in one of said mobile device and base device, receiving an acoustic signal;

with a processor in one of the mobile device and the base device:

determining a correlation of a second signal with the received acoustic signal, the second signal corresponding to (a) an acoustic signal received by the microphone in the other one of said mobile device and the base device, or (b) a control signal used to control the speaker in the other one of said mobile device and the base device to output the acoustic signal, determining the acoustic quality and/or the distance between the mobile device and the base device based on the correlation, and deactivating a speaker of the mobile device in response to determining that the mobile device is closer than a threshold distance to the base device or the acoustic quality is greater than a threshold value.

7. The method as claimed in claim 6, wherein determining the correlation includes:
with the processor, determining coefficients of an adaptive filter which cancels the second signal from the received acoustic signal.

8. The method as claimed in claim 6, wherein the step of determining the acoustic quality or distances comprises determining the acoustic quality between the mobile device and the base device from at least one of (i) a dispersion around a detected peak; or (ii) a reverberation time around the detected peak.

9. The method as claimed in claim 6, wherein the speaker of the mobile device is deactivated in response to determining that the acoustic quality is greater than the threshold value.

10. A system, comprising:
a mobile device having a microphone and a speaker;
a base device having a microphone and a speaker;
wherein one of the mobile device and base unit is arranged to receive, by its microphone, an acoustic signal;
a processor configured to:
determine a correlation of a second signal with the received acoustic signal, the second signal corresponding to (a) an acoustic signal received by the microphone in the other one of said mobile device and base device, or (b) a control signal used to control the speaker in the other one of said mobile device and base device to output the acoustic signal; and
determine the acoustic quality and/or the distance between the mobile device and the base device based on at least one of (i) a dispersion around a detected peak and (ii) a reverberation time around the detected peak.

11. The system as claimed in claim 10, wherein determining the correlation between the second signal and the received acoustic signal includes, with the processor, determining coefficients of an adaptive filter for removing the second signal from the received acoustic signal.

12. The system as claimed in claim 11, wherein the acoustic signal received by the microphone in one of the mobile device and the base device is received from the speaker in the other of the mobile device and the base device, the speaker being configured to output the acoustic signal in response to a control signal.

13. The system as claimed in claim 12, wherein the processor is further configured to control the speaker in one of the mobile device and the base device is configured to output the acoustic signal, and wherein the acoustic signal received by the microphone in one of the mobile device and the base device includes receiving the acoustic signal from the speaker in the other of the mobile device and the base device.

14. The system as claimed in claim 13, wherein the processor is further configured to determine the acoustic quality and/or distance by:
detecting a first peak in a result of determining a first peak resulting from correlating the acoustic signal received by the speaker of one of the mobile device and the base device and a second peak corresponding to an acoustic signal received by the speaker of the other of the mobile device and the base device.

15. The system as set forth in claim 14, wherein the processor is further configured to:
when determining the acoustic quality, determining at least one of (i) a ratio of magnitudes of the first and second peaks, (ii) dispersion around the second peak, and (iii) the reverberation time around the second peak.

16. The system as claimed in claim 10, wherein the processor is further configured to:
deactivate the speaker of the mobile device in response to determining that the mobile device is closer than a threshold distance to the base device or the acoustic quality is greater than a threshold value.

17. The system as claimed in claim 10, wherein the processor is further configured to:
deactivate the speaker of the mobile device in response to determining that the acoustic quality is greater than a threshold value.

* * * * *